(12) United States Patent
Weiler et al.

(10) Patent No.: US 8,762,293 B2
(45) Date of Patent: Jun. 24, 2014

(54) CONDITION DATA MANAGEMENT (75) Inventors: Thomas Weiler, Saarlouis (DE); Achim Lehmann, Kirkel (DE); Martina Wingert, Eppelborn (DE)

(73) Assignee: SAP AG, Walldorf (DE)

( * ) Notice: Subject to any disclaimer, the term of this patent is extended or adjusted under 35 U.S.C. 154(b) by 1609 days.

(21) Appl. No.: 11/646,824

(22) Filed: Dec. 28, 2006

(65) Prior Publication Data
US 2008/0162379 A1    Jul. 3, 2008

(51) Int. Cl.
*G06F 17/00* (2006.01)
*G06G 7/00* (2006.01)
*G06Q 10/00* (2012.01)
*G06Q 30/00* (2012.01)

(52) U.S. Cl.
USPC ............................ 705/400; 705/7.35; 705/1.1

(58) Field of Classification Search
USPC .......................... 705/1.1, 7.11–7.42, 400–412
See application file for complete search history.

(56) References Cited

U.S. PATENT DOCUMENTS

| | | | |
|---|---|---|---|
| 4,405,987 A | 9/1983 | Spalti | |
| 4,568,934 A | 2/1986 | Allgood | |
| 4,922,419 A | 5/1990 | Ohashi et al. | |
| 5,400,253 A | 3/1995 | O'Connor | |
| 5,451,755 A | 9/1995 | Duval et al. | |
| 5,924,892 A | 7/1999 | Ferracina | |
| 5,930,771 A | 7/1999 | Stapp | |
| 6,058,373 A | 5/2000 | Blinn et al. | |
| 6,088,363 A | 7/2000 | Shiobara | |
| 6,144,887 A | 11/2000 | Kamiya et al. | |
| 6,311,165 B1 | 10/2001 | Coutts et al. | |
| 6,389,375 B1 | 5/2002 | Thomsen et al. | |
| 6,408,258 B1 * | 6/2002 | Richer | 702/182 |
| 6,507,851 B1 | 1/2003 | Fujiwara et al. | |
| 6,512,966 B2 | 1/2003 | Lof et al. | |
| 6,633,823 B2 | 10/2003 | Bartone et al. | |
| 6,640,278 B1 | 10/2003 | Nolan et al. | |
| 6,697,951 B1 | 2/2004 | Sinha et al. | |

(Continued)

FOREIGN PATENT DOCUMENTS

JP    2004-30343 A    1/2004

OTHER PUBLICATIONS

Office Action for U.S. Appl. No. 10/863,816, mailed Apr. 1, 2009, 8 pages.

(Continued)

*Primary Examiner* — George Chen
(74) *Attorney, Agent, or Firm* — Brake Hughes Bellermann LLP (57) ABSTRACT

A computer-implemented method of managing data includes identifying a plurality of conditions pertaining to a price or a maintenance condition and defining at least one condition selection variant, the condition selection variant representing a plurality of conditions. At least a first key field identifying an item to be associated with at least one of the conditions and is linked to at least a second key field identifying a variable corresponding to the condition. The second key field is displayed to enable data entry by a user to specify the variable corresponding to the price or the maintenance condition pertaining to the item identified in the first key field. The price or the maintenance condition of the item identified in the first key field is determined by processing each condition of the plurality of conditions associated with the condition variant.

26 Claims, 3 Drawing Sheets

(56) References Cited

U.S. PATENT DOCUMENTS

| | | | |
|---|---|---|---|
| 6,763,999 B2 | 7/2004 | Coventry | |
| 6,785,592 B1 | 8/2004 | Smith et al. | |
| 6,850,820 B2 | 2/2005 | Tajima | |
| 6,904,385 B1 | 6/2005 | Budike, Jr. | |
| 6,910,017 B1 | 6/2005 | Woo et al. | |
| 6,963,854 B1* | 11/2005 | Boyd et al. | 705/37 |
| 6,980,966 B1 | 12/2005 | Sobrado et al. | |
| 6,997,642 B2 | 2/2006 | Bishop, Jr. | |
| 7,043,459 B2 | 5/2006 | Peevey | |
| 7,072,843 B2 | 7/2006 | Menninger et al. | |
| 7,092,929 B1 | 8/2006 | Dvorak et al. | |
| 7,117,165 B1 | 10/2006 | Adams et al. | |
| 7,139,731 B1 | 11/2006 | Alvin | |
| 7,379,890 B2 | 5/2008 | Myr et al. | |
| 2002/0023500 A1 | 2/2002 | Chikuan et al. | |
| 2002/0026368 A1 | 2/2002 | Carter, III | |
| 2002/0078159 A1 | 6/2002 | Petrogiannis et al. | |
| 2002/0107713 A1 | 8/2002 | Hawkins | |
| 2002/0138176 A1 | 9/2002 | Davis et al. | |
| 2002/0147668 A1 | 10/2002 | Smith et al. | |
| 2002/0173990 A1 | 11/2002 | Marasco | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046195 A1 | 3/2003 | Mao | |
| 2003/0065646 A1 | 4/2003 | Joseph et al. | |
| 2003/0074250 A1 | 4/2003 | Burk | |
| 2003/0130883 A1 | 7/2003 | Schroeder et al. | |
| 2003/0144864 A1 | 7/2003 | Mazzarella | |
| 2003/0158791 A1 | 8/2003 | Gilberto et al. | |
| 2003/0172007 A1 | 9/2003 | Helmolt et al. | |
| 2003/0229502 A1 | 12/2003 | Woo | |
| 2003/0233307 A1 | 12/2003 | Salvadori et al. | |
| 2004/0068443 A1 | 4/2004 | Hopson et al. | |
| 2004/0098358 A1 | 5/2004 | Roediger | |
| 2004/0102872 A1 | 5/2004 | Schick et al. | |
| 2004/0107141 A1 | 6/2004 | Conkel et al. | |
| 2004/0107180 A1* | 6/2004 | Yoshida | 707/1 |
| 2004/0122766 A1 | 6/2004 | Brooks et al. | |
| 2004/0162763 A1 | 8/2004 | Hoskin et al. | |
| 2004/0186783 A1 | 9/2004 | Knight et al. | |
| 2004/0199441 A1 | 10/2004 | Mayfield | |
| 2004/0210542 A1* | 10/2004 | Sweeney | 705/400 |
| 2004/0220861 A1 | 11/2004 | Morciniec et al. | |
| 2004/0267599 A1* | 12/2004 | Heires et al. | 705/10 |
| 2004/0267674 A1 | 12/2004 | Feng et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096947 A1 | 5/2005 | Fox et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0104555 A1 | 5/2005 | Simmonds-Short | |
| 2005/0165659 A1 | 7/2005 | Gruber | |
| 2005/0177442 A1 | 8/2005 | Sullivan et al. | |
| 2005/0197887 A1 | 9/2005 | Zuerl et al. | |
| 2005/0209906 A1 | 9/2005 | Bayoumi et al. | |
| 2006/0036507 A1 | 2/2006 | Pujar et al. | |
| 2006/0112099 A1 | 5/2006 | Musgrove et al. | |
| 2006/0149653 A1 | 7/2006 | Davis et al. | |
| 2006/0178986 A1 | 8/2006 | Giordano et al. | |
| 2006/0206385 A1* | 9/2006 | Walker et al. | 705/21 |
| 2006/0259376 A1 | 11/2006 | Ferreri et al. | |
| 2007/0239373 A1 | 10/2007 | Nasle | |
| 2007/0271185 A1 | 11/2007 | Engler et al. | |
| 2007/0299790 A1* | 12/2007 | Berkovitz et al. | 705/400 |

OTHER PUBLICATIONS

Office Action for U.S. Appl. No. 10/863,816, mailed Dec. 1, 2009, 8 pages.
Office Action for U.S. Appl. No. 10/863,816, mailed Nov. 13, 2008, 8 pages.
Office Action for U.S. Appl. No. 10/927,645, mailed Apr. 1, 2009, 33 pages.
Office Action for U.S. Appl. No. 10/927,645, mailed Feb. 23, 2010, 30 pages.
Office Action for U.S. Appl. No. 10/927,645, mailed Oct. 15, 2008, 20 pages.
Office Action for U.S. Appl. No. 10/927,645, mailed Sep. 2, 2009, 33 pages.
Office Action for U.S. Appl. No. 11/028,491, mailed Dec. 22, 2009, 16 pages.
Office Action for U.S. Appl. No. 11/028,491, mailed Dec. 9, 2008, 16 pages.
Office Action for U.S. Appl. No. 11/028,491, mailed Jun. 22, 2009, 14 pages.
Office Action for U.S. Appl. No. 11/028,491, mailed May 10, 2010, 19 pages.
Office Action for U.S. Appl. No. 11/028,491, mailed May 27, 2008, 12 pages.
Office Action for U.S. Appl. No. 11/529,739, mailed Jan. 22, 2010, 20 pages.
Office Action for U.S. Appl. No. 11/529,739, mailed Jul. 14, 2009, 21 pages.
Office Action for U.S. Appl. No. 11/529,739, mailed Mar. 12, 2009, 8 pages.
Office Action for U.S. Appl. No. 11/529,739, mailed Sep. 29, 2008, 14 pages.
Office Action for U.S. Appl. No. 11/590,192, mailed Nov. 27, 2009, 10 pages.
U.S. Appl. No. 60/374,892, filed Apr. 22, 2002, Krajec.
"Beyond Markdown Management", summer/autumn 03, the 4caster, Issue 4, vol. 2, 4 pages, Jun. 2003.
"Retailers Manage Markdown Challenges Using i2 Solutions", Jan. 13, 2003, NRF 92nd Annual Convention & Expo, 2 pages.
Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 pages.
Melcher, "Local tech firm creates retail markdown tool", Mar. 24, 2000, Cincinnati Business Courier, 3 pages.
News Service Science, "A virtual power station in the resing for . . . a virtual power station in the resin for the power supply from tomorrow", Yokes Brikmann Technical University of Clausthal, pp. 1-2 (Sep. 8, 2004) (http://www.idw-online.de/pages/de/news85375 (Mar. 18, 2006).
Profitlogic, available at http://webarchive.org/web/2002060311838/, available at least by Apr. 15, 2005, 22 pages.
Rheinland-Pfalz, "Virtuelles Kraftwerk-Intelligente Energie fur Klima- und Ressourcenschutz", Secretary of State of Margit Conrad, Stefanie center two emperor Friedrich road 1.55116 Mainz , pp. 1-5 (Jun. 6, 2005) (with translation) (2 pages).
Siemens AG—PoF 1/02 Artike 121 Energieversorgung Irtuelle Kraftwerke (www.siemens.com) (Mar. 18, 2006).
Subrahmanyan et al., "Developing optimal pricing and inventory policies for retailers who face uncertain demand", Journal of Retailing, vol. 72, No. 1, Spring, 1996, 15 pages.
Verivox, http://www.verivox.de/News/ArticleDetails.asp?aid=10141 (Mar. 18, 2006) (4 pages) (with translation).
Virtual Power Station, http://de.wikipedia.org/wiki/Virtuelles_Kraftwerk (Mar. 18, 2006) (4 pages) (with translation).

* cited by examiner

FIG. 1

| Condition type | Text of condition type | Plausibility status | Access level/ hierarchy | Text of the access level/ hierarchy | Key fields | Value | Currency | Mode of calculation | Date from | Date to |
|---|---|---|---|---|---|---|---|---|---|---|
| K001 | Discount | | | | | | | | | |
| | | O O | 1 | Product line/ supplier/ material | | | | | | |
| | | | | | .... | 10 | | % | 1/1/2006 | 5/15/2006 |
| | | | | | .... | 13 | | % | 5/16/2006 | 12/31/9999 |
| | | | 2 | Supplier/ Material | | | | | | |
| | | | | | .... | 9 | | % | 1/1/2004 | 12/31/9999 |
| | | | 3 | Material | | | | | | |
| | | | | | .... | 15 | | % | 2/1/2006 | 12/31/9999 |
| KW02 | Additional charge | O O | | Additional charge KW02 | | | | | | |
| | | | 1 | Product line/ material | | | | | | |
| | | | 2 | Material | | | | | | |
| | | | | | .... | 5 | EUR | Set amount | 1/1/2006 | 12/31/9999 |

FIG. 5

| Selection for each condition type | ------------------→ | Condition type XYZ |
|---|---|---|
| Condition selection variant | Variant 1 | |
| | Variant 2 | |
| | Variant 3 | |

FIG. 6

| Key field 1 | --------------- | to | -------------------- | → |
|---|---|---|---|---|
| Key field 2 | --------------- | to | -------------------- | → |
| Key field 3 | --------------- | to | -------------------- | → |
| - | | | | |
| - | | | | |
| - | | | | |
| - | | | | |
| Date from | --------------- | to | -------------------- | → |

FIG. 7

CONDITION DATA MANAGEMENT

FIELD

The present disclosure generally relates to the field of managing data. The present disclosure relates more specifically to management of pricing and/or maintenance condition data.

BACKGROUND

Management of pricing and other types of data has often been difficult in that an organized structure of pricing or other types of data for similar items has been individually maintained, requiring multiple changes to address a general adjustment to the data. By way of example, prices for many different items are often controlled individually, requiring sales or other general changes to a large number of prices to be handled separately for individual items. This has often resulted in errors of incorrect applications of pricing adjustments, or other changes to data, meant to apply in general or targeted fashion to a plurality of items. Thus, there is a need to apply a more structured approach to management of data for a plurality of items.

SUMMARY

One embodiment relates to a computer-implemented method of determining pricing. The method includes predetermining a plurality of conditions, each condition defining at least one component of a price and associating at least two conditions of the plurality of conditions to a condition variant. The condition variant is associated to a product or a service, and a price of the product or service is determined by processing each condition associated with the condition variant. In another embodiment, a computer-readable medium may also be provided.

A further exemplary embodiment provides a computer-implemented method of managing data. The method includes identifying a plurality of conditions pertaining to a price or a maintenance condition and defining at least one condition selection variant, the condition selection variant representing a plurality of conditions. At least a first key field identifying an item to be associated with at least one of the conditions and is linked to at least a second key field identifying a variable corresponding to the condition. The second key field is displayed to enable data entry by a user to specify the variable corresponding to the price or the maintenance condition pertaining to the item identified in the first key field. The price or the maintenance condition of the item identified in the first key field is determined by processing each condition of the plurality of conditions associated with the condition variant.

A computer-readable medium for use with an electronic device is provided according to a further embodiment. The medium has instructions executable using the electronic device for performing a method of managing data. The instructions include predetermining a plurality of conditions, each condition defining at least one component of a price; associating at least two conditions of the plurality of conditions to a condition variant; associating the condition variant to a product or a service; and determining a price of the product or service by processing each condition associated with the condition variant.

A further embodiment provides a computer-implemented method of managing condition data. The method includes establishing a plurality of conditions pertaining to an item, each condition relating to the determination of a price of the item; assigning a hierarchy level to each condition; displaying the plurality of conditions and the hierarchy level assigned to each condition; and automatically determining the price of the item by the use of at least two conditions of the plurality of conditions, in accordance with the hierarchy level assigned to each condition.

A further embodiment provides a system for determining pricing. The system includes a condition module configured to determine a plurality of conditions, each condition defining at least one component of a price; a variant module configured to associate at least two conditions of the plurality of conditions to a condition variant and associate the condition variant to a product or a service; and a processing module configured to determine a price of the product or service by processing each condition associated with the condition variant.

A further embodiment provides a system for managing data. The system includes a condition module configured to identify a plurality of conditions pertaining to a price or a maintenance condition; a variant module configured to define at least one condition selection variant, the condition selection variant representing a plurality of conditions; a key field module configured to link at least a first key field identifying an item to be associated with at least one of the conditions and at least a second key field identifying a variable corresponding to the condition; a display to display the second key field to enable data entry by a user to specify the variable corresponding to the price or the maintenance condition pertaining to the item identified in the first key field; and a processing module configured to determine the price or the maintenance condition of the item identified in the first key field by processing each condition of the plurality of conditions associated with the condition variant.

A further embodiment provides a system for managing condition data. The system includes a condition module configured to establish a plurality of conditions pertaining to an item, each condition relating to the determination of a price of the item; a hierarchy module configured to assign a hierarchy level to each condition; a display to display the plurality of conditions and the hierarchy level assigned to each condition; and a processing module configured to automatically determine the price of the item by the use of at least two conditions of the plurality of conditions, in accordance with the hierarchy level assigned to each condition.

A further embodiment provides a system for determining pricing. The system includes means for predetermining a plurality of conditions, each condition defining at least one component of a price; means for associating at least two conditions of the plurality of conditions to a condition variant; means for associating the condition variant to a product or a service; and means for determining a price of the product or service by processing each condition associated with the condition variant.

DETAILED DESCRIPTION OF THE EXEMPLARY EMBODIMENTS

Figure 1:
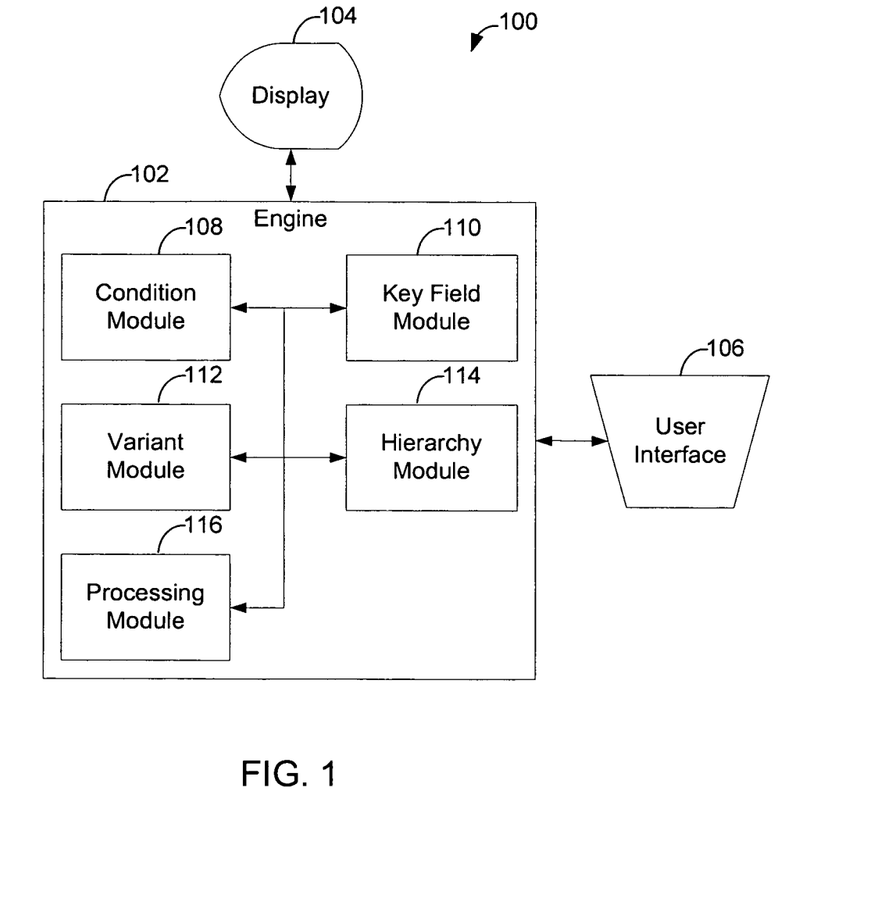
FIG. 1 is a schematic block diagram illustrating a data management system according to one exemplary embodiment.

Referring to FIG. 1, a data management system 100 is configured to manage data and associated conditions related to transactions. Examples of transactions can include, for example, financial transactions, pricing and providing of goods and/or services. The data management system 100 may manage data and conditions to provide functionality such as for, by way of non-limiting examples: business aspects/criteria considerations and management, transparency of conditions (e.g. condition spanning), business process management, management for any type of condition (e.g. procurement area, sales area, etc.), customer specific plausibility checks, mass condition management possibilities, generic and dynamic condition management tools and features, "user-friendly" application layout and design, etc.

In one example implementation, the system 100 may be used to determine retail prices of a large number of products and services. The system 100 may be used to provide different prices among different stores, such as by, for example, using different discounts and different effective times of the discounts. Differences in transportation and/or storage costs can be accounted for by increasing prices in the corresponding stores or regions for the same types of goods sold across many stores or regions. Another example of differences in prices is accounting for different state sales tax rates.

Although embodiments describing retail products are discussed, the system 100 can be used in non-retail applications. Applications can also include, for example, wholesale applications, inter and intra-organizational cost accounting applications. Examples of applications can include providing prices or transaction data for one or more levels of the distribution chain, including differentiating prices for the same types of goods based on a wide variety of variables, such as geography, supplier, average prices in a store or region and date ranges. Transactions can refer to large items, small items, services and combinations thereof. A wide variety of pricing types can be used, including, for example, commodity pricing, retail pricing, custom pricing, variable discounts, as explained by way of further examples herein. System 100 can be used in the pricing and selling of services including financial services, medical services and other services for which pricing or other data can be associated.

For purposes of this disclosure, a condition is defined as any information related to a transaction. For example, a condition may be an agreement made on prices, additional charges for a transaction, reduced charges for a transaction, taxes, etc., which are dependent on various factors (e.g., supplier input, customer input, customer group input, supplier offerings, article data, service data, etc.) that are valid for a specific time period.

Data management system 100 generally includes an engine 102, a display 104, and a user interface 106. Engine 102 is configured to manage data and conditions for a transaction according to input on user interface 106 and/or predetermined hardware logic or software algorithms. Engine 102 includes a condition module 108, a key field module 110, a variant module 112, a hierarchy module 114, and a processing module 116. It is understood that while engine 102 is shown to contain each module 108-116 locally, in other exemplary embodiments, one or more of modules 108-116 may be distributed to remote locations, for example servers, and accessed across a network such as the Internet, a LAN, a WAN, etc. It is also noted that while each of the modules of engine 102 are shown to be separate, in other exemplary embodiments any one or more of the modules may be combined into a single structure.

Display 104 is configured to give a visual output from engine 102 to a user. According to one exemplary embodiment, display 104 may give information relating to data management as it relates to a transaction involving a product or service or any other information that may be available to engine 102. In various examples, display 104 may be a cathode-ray-tube (CRT) display, liquid crystal display (LCD), plasma display, digital light processing (DLP) display, or any other past, present, or future display technology.

User interface 106 is configured to provide a user with access to engine 102. A user may make modifications to data related to a transaction or a condition related to the transaction. A user may wish to view data management information on display 104 and may manipulate user interface 106 to make such selections. According to various exemplary embodiments, user interface 106 may be of any past, present, or future design and may include one or more of a tactile touch screen on display 104, a knob, a pushbutton, a directional controller, a lever, voice activation, any other means of control, or any combination thereof. User interface 106 may also include a computer-readable media drive to facilitate software updates; uploading of stock, sales, or reallocation information; or other functions loadable from a computer readable medium.

Condition module 108 is configured to identify conditions as they relate to a transaction. Each condition generally defines at least one component of the transaction, for example, a price component (e.g. a discount, a base price, an additional charge, a tax, etc.) and/or a maintenance condition component (e.g. a plausibility check). It is noted that some exemplary embodiments, each component may be defined by a different condition. For example, in an embodiment that includes multiple discounts, each discount may be defined by a different condition. In an exemplary embodiment that includes a plausibility check, each condition applicable to the price of a product may be compared to determine if there are any logical inconsistencies in applying the conditions. If there are logical inconsistencies, the user may be notified via display 104 or another output device. In another exemplary embodiment, each of the conditions may be displayed on display 104 in a suitable format for viewing by a user, such as in a table.

Key field module 110 is configured to link one or more key fields to each identified condition from condition module 108. Each key field typically represents a variable that corresponds to a condition. For example, a key field of a condition may define an effective date limitation, a geographical limitation, etc. In one exemplary embodiment, one or more key fields may be specified on display 104 as data entry fields so that a user may manually provide input data (e.g., corresponding to a price or maintenance condition pertaining to a key field) and/or so that the user may verify the key field data. In another exemplary embodiment, each condition may be associated with a unique key, that is to say a scalar key value that is different from the key values of each other condition, but having at least one character corresponding to a condition type. In still another exemplary embodiment, a key field may identify an item and/or a variable. For purposes of this disclosure, an item may be defined as a product, object, or service that data management system 100 is concerned with, for example a stapler, desk, chair, fax machine, etc. if a business were selling office supplies. A variable may be defined as the content of a key field, for example, if a condition were a discount, the key field may identify a start date, an end date, a geographical region, a percent discount, a base price, etc.

Variant module 112 is configured to associate at least two conditions into a condition selection variant or condition variant. Each condition variant may be associated with a particular product or service as desired by input from a user on user interface 106 or by a predetermined algorithm run by engine 102. For example, a user may wish to create a condition variant of all conditions pertaining to office products, to cleaning services, etc.

Hierarchy module 114 is configured to establish a hierarchy of conditions by assigning a hierarchy level to each condition. For example, one condition may have a higher-ranking condition than another condition, which may be lower ranking. Such hierarchy levels may be defined manually by a user on user interface 106, automatically by a predetermined program running on engine 102, or any combination thereof. The hierarchy levels may also be displayed on display 104 for verification and/or viewing by a user.

Processing module 116 is configured to process data and make determinations based on input from modules 108-114 and user interface 106. According to one exemplary embodiment where a price is determined, processing module 116 may determine a price of a product or service by processing each condition associated with a condition variant. According to another exemplary embodiment, process module 116 may determined a price for a product or service by the use of at least two conditions in accordance with the hierarchy level assigned to each condition by hierarchy module 114. For example, in the event of conflicts between conditions, the price can be determined by higher-ranking conditions that take precedence over lower ranking conditions.

Figure 2:
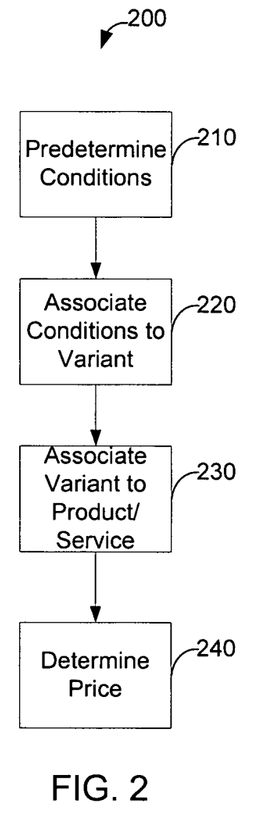
FIG. 2 is a process flow diagram illustrating a method for determining a price in the data management system of FIG. 1, according to an exemplary embodiment.

Referring to FIG. 2, a computer-implemented method 200 of managing data, for example, determining pricing, is shown. Method 200 predetermines a plurality of conditions, at step 210. Each condition may define at least one component of a price. It is noted that in other exemplary embodiments, method 200 may be implemented on any computer-readable medium for use with an electronic device that has instructions executable on the electronic device. Method 200 associates at least two of the conditions to a condition variant in variant module 112 at step 220. Method 200 associates the condition variant to a product or service in variant module 112 at step 230. Method 200 determines a price, step 240, of the product or service by processing each condition associated with the condition variant in processing module 116.

Figure 3:
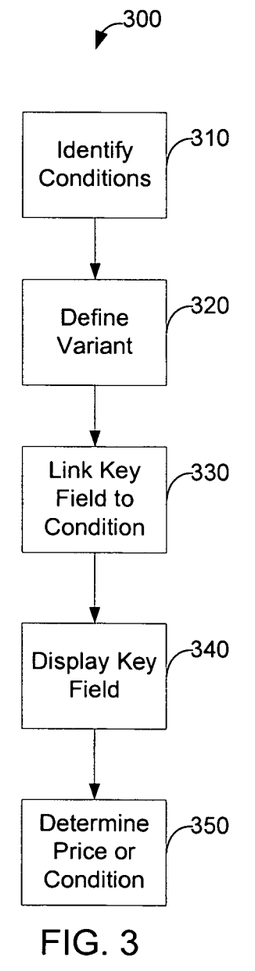
FIG. 3 is a process flow diagram illustrating a method for managing data to determine a price or management condition in the data management system of FIG. 1, according to an exemplary embodiment.

Referring to FIG. 3 a computer-implemented method 300 of managing data is shown. Method 300 identifies a plurality of conditions pertaining to a price or a maintenance condition in condition module 108 at step 310. Method 300 defines at least one condition selection variant in variant module 112 at step 320. The condition selection variant typically represents a plurality of conditions. Method 300 links at least a first key field identifying an item to be associated with at least one of the conditions and at least a second key field identifying a variable corresponding to the condition in key field module 110 at step 330. Method 300 displays the second key field on display 104 at step 340. This may enable data entry by a user on user interface 106 to specify the variable corresponding to the price or the maintenance condition pertaining to the item identified in the first key field. Method 300 determines the price or the maintenance condition of the item identified in the first key field at step 350. This determination is made by processing each condition of the plurality of conditions associated with the condition variant in processing module 116.

Figure 4:
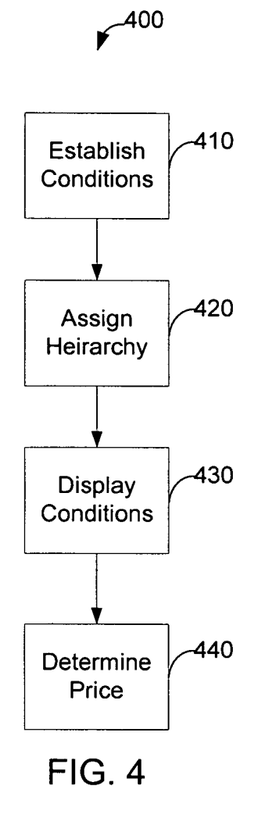
FIG. 4 is a process flow diagram illustrating a method for managing condition data to determine a price in accordance with a hierarchy level in the data management system of FIG. 1, according to an exemplary embodiment.

Referring to FIG. 4, a computer implemented method 400 of managing condition data is shown. Method 400 establishes a plurality of conditions pertaining to an item in condition module 108 at step 410. Each condition may relate to the determination of a price of the item. Method 400 assigns a hierarchy level to each condition in hierarchy module 114 at step 420. Method 400 displays the plurality of conditions and the hierarchy level assigned to each condition on display 104 at step 430. This may enable data entry by a user on user interface 106 to verify or modify the hierarchy data or other data pertaining to each condition. Method 400 automatically determines the price, step 440, of the item by the use of at least two of the conditions, in accordance with the hierarchy level assigned to each conditions.

Figure 5:
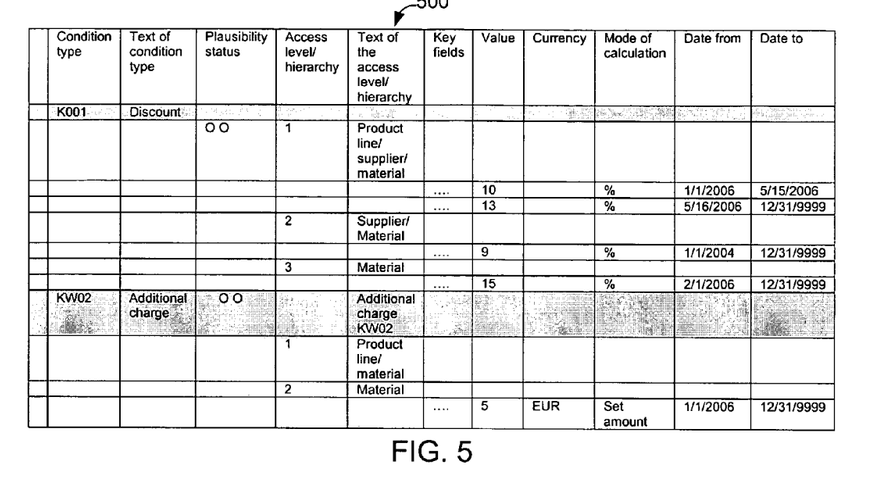
FIG. 5 is table illustrating schematic representations of conditions for various example conditions that may exist in the data management system of FIG. 1, according to exemplary embodiments.

Referring to FIG. 5, a table 500 illustrates schematic representations of conditions for various example conditions that may exist in data management system 100. According table 500, the display of the conditions appears in blocks according to condition type. For each condition type, each condition in that set or hierarchy may be listed in ascending "date from" order, or another order specified by a user may be used. Condition type rows, access level rows, and hierarchy rows are each marked with different shading for increased clarity. The columns of the key fields include all key fields of all condition tables of the displayed conditions types. As given in this particular example, only the fields presented in white are ready for the input of the respective change.

Figure 6:
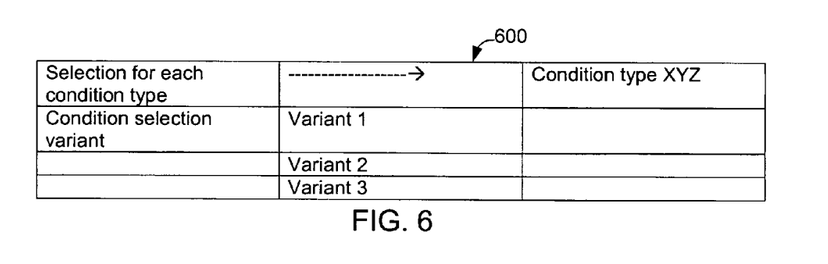
FIGS. 6 and 7 are schematic representations of a selection area for input and execution of conditions in the data management system of FIG. 1, according to an exemplary embodiment.
Figure 7:
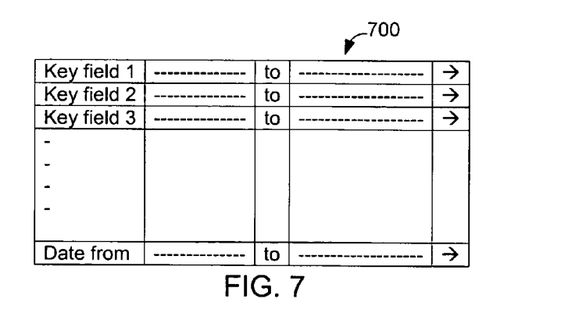

Referring to FIGS. 6 and 7, tables 600 and 700 illustrate schematic representations of a selection area for input and execution of conditions in data management system 100. The selection area serves for input and execution of desired conditions. As shown in table 600, a user may select products or services based on a certain criteria or condition variant. Within the selection area, a dropdown list may be available so that a user may choose between a condition type of a specific selection and an overlapping condition type selection using condition variants. Table 700 provides further selection options as key fields linked to various conditions (e.g., an effective "date from" field) are available for selection in a condition variant.

It is important to note that the construction and arrangement of the stock management system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

What is claimed is:

1. A computer program product, the computer program product being tangibly embodied on a non-transitory computer-readable storage medium and including instructions that, when executed by at least one processor, are configured to:
   predetermine a plurality of conditions related to a transaction, each condition defining at least one component of a price for a product or service related to the transaction, each condition having a range of values that variably affect the price, and along with each component of the price, each condition having at least one variable related to a geographical application that variably affects the price;
   assigning a hierarchy level to each condition;
   associate each of the plurality of conditions to a condition variant, the condition variant being a variant from the range of values for each condition;
   associate the condition variant to the product or service; and
   determine the price of the product or service including processing each condition associated with the condition variant and in accordance with the hierarchy level assigned to each condition.

2. The computer program product of claim 1, wherein the instructions that, when executed by the at least one processor, are configured to:
   link one or more key fields to each condition, each key field representing one or more variables including the at least one variable corresponding to each condition.

3. The computer program product of claim 2, wherein the one or more key fields include a date range application including an effective date.

4. The computer program product of claim 2, wherein the one or more key fields include the geographical application.

5. The computer program product of claim 1, wherein the instructions that, when executed by the at least one processor, are configured to:
   specify one or more key fields for each condition to display as data entry fields for input of data by a user.

6. The computer program product of claim 5, wherein the instructions that, when executed by the at least one processor, are configured to:
   receive the data as input from the user corresponding to the one or more key fields being displayed.

7. The computer program product of claim 1, wherein the instructions that, when executed by the at least one processor, are configured to:
   specify one or more key fields for each condition to display for purposes of data verification by a user.

8. The computer program product of claim 7, wherein the instructions that, when executed by the at least one processor, are configured to:
   receive input from the user corresponding to the data relating to the one or more key fields being displayed for each condition.

9. The computer program product of claim 1, wherein the instructions that, when executed by the at least one processor, are configured to:
   associate each condition of the plurality of conditions to a unique key, the unique key being different from unique keys of other conditions, but having at least one character corresponding to a condition type.

10. The computer program product of claim 1, wherein the at least one component of the price includes is a discount that variable affects the price.

11. The computer program product of claim 1, wherein the at least one component of the price includes a base price that variable affects the price.

12. The computer program product of claim 1, wherein the at least one component of the price includes an additional charge that variable affects the price.

13. The computer program product of claim 1, wherein the at least one component of the price includes a tax that variable affects the price.

14. The computer program product of claim 1, wherein the at least one component of the price includes a plurality of components of the price including one or more discounts, each of the discounts defined by a different variable of each condition.

15. The computer program product of claim 1, wherein the instructions that, when executed by the at least one processor, are configured to:
   display each of the plurality of conditions in a table.

16. The computer program product of claim 1, wherein the instructions that, when executed by the at least one processor, are configured to:
   receive input from a user to specify each condition.

17. The computer program product of claim 1, wherein the instructions that, when executed by the at least one processor, are configured to:

establish a hierarchy of conditions, the price being determined by one or more higher-ranking conditions controlling in the event of conflicts with one or more lower-ranking conditions.

18. The computer program product of claim 1, wherein the instructions that, when executed by the at least one processor, are configured to:
perform a plausibility check, each of the conditions applicable to the price of the product or service is compared to determine if there are any logical inconsistencies in applying each of the conditions to determine the price; and
notify a user if there are any logical inconsistencies determined with the plausibility check.

19. The computer program product of claim 1, wherein the plurality of conditions include a first condition and a second condition that is different than the first condition, the first condition having a higher-ranking hierarchy level than the second condition.

20. A computer-implemented method, comprising:
identifying a plurality of conditions related to a transaction, each condition defining at least one component of a price for a product or service related to the transaction, each condition having a range of values that variably affect the price, and along with each component of the price, each condition having at least one variable related to a geographical application that variably affects the price;
assigning a hierarchy level to each condition;
defining at least one condition selection variant for each of the plurality of conditions, the condition selection variant being a variant from the range of values;
linking at least one first key field identifying an item to be associated with at least one of the conditions and at least one second key field identifying the at least one variable corresponding to the at least one of the conditions;
on a display, displaying the at least one second key field to enable data entry by a user to specify the at least one variable corresponding to the price related to the item identified in the first key field; and
by a computer, determining the price of the item identified in the at least one first key field including processing each condition of the plurality of conditions associated with the condition selection variant and in accordance with the hierarchy level assigned to each condition.

21. The method of claim 20, wherein the plurality of conditions include a first condition and a second condition that is different than the first condition, the first condition having a higher-ranking hierarchy level than the second condition.

22. A computer system including instructions recorded on a non-transitory computer-readable medium and executable by at least one processor, the system comprising:
a condition module configured to determine a plurality of conditions related to a transaction, each condition defining at least one component of a price for a product or service related to the transaction, each condition having a range of values that variably affect the price, and along with each component of the price, each condition having at least one variable related to a geographical application that variably affects the price;
a hierarchy module configured to assign a hierarchy level to each condition;
a variant module configured to associate each of the plurality of conditions to a condition variant, and associate the condition variant to the product or service, the condition variant being variant data relating to condition data for each condition which differs from standard condition data for each condition; and
a processing module configured to determine the price of the product or service including processing each condition associated with the condition variant and in accordance with the hierarchy level assigned to each condition.

23. The system of claim 22, wherein the plurality of conditions include a first condition and a second condition that is different than the first condition, the first condition having a higher-ranking hierarchy level than the second condition.

24. A computer-implemented method, comprising:
predetermining a plurality of conditions related to a transaction, each condition defining at least one component of a price for a product or service related to the transaction, each condition having a range of values that variably affect the price, and along with each component of the price, each condition having at least one variable related to a geographical application that variably affects the price;
assigning a hierarchy level to each condition;
associating each of the plurality of conditions to a condition variant, the condition variant being a variant from the range of values for each condition;
associating the condition variant to the product or service; and
by a computer, determining the price of the product or service including processing each condition associated with the condition variant and in accordance with the hierarchy level assigned to each condition.

25. A computer system including instructions recorded on a non-transitory computer-readable medium and executable by at least one processor, the system comprising:
a condition module configured to identify a plurality of conditions related to a transaction, each condition defining at least one component of a price for a product or service related to the transaction, each condition having a range of values that variably affect the price, and along with each component of the price, each condition having at least one variable related to a geographical application that variably affects the price;
a hierarchy module configured to assign a hierarchy level to each condition;
a variant module configured to define at least one condition selection variant for each of the plurality of conditions, the condition selection variant being a variant from the range of values;
a key field module configured to link at least one first key field identifying an item to be associated with at least one of the conditions and at least one second key field identifying the at least one variable corresponding to the at least one of the conditions;
a display to display the at least one second key field to enable data entry by a user to specify the at least one variable corresponding to the price related to the item identified in the first key field; and
a processing module configured to determine the price of the item identified in the at least one first key field including processing each condition of the plurality of conditions associated with the condition selection variant and in accordance with the hierarchy level assigned to each condition.

26. A computer system including instructions recorded on a non-transitory computer-readable medium and executable by at least one processor, the system comprising:
means for predetermining a plurality of conditions related to a transaction, each condition defining at least one component of a price for a product or service related to the transaction, each condition having a range of values that variably affect the price, and along with each component of the price, each condition having at least one variable related to a geographical application that variably affects the price;
means for assigning a hierarchy level to each condition;
means for associating each of the plurality of conditions to a condition variant, the condition variant being a variant from the range of values for each condition;
means for associating the condition variant to the product or service; and
means for determining the price of the product or service including processing each condition associated with the condition variant and in accordance with the hierarchy level assigned to each condition.

* * * * *